(12) United States Patent
Dawson et al.

(10) Patent No.: US 7,030,856 B2
(45) Date of Patent: Apr. 18, 2006

(54) METHOD AND SYSTEM FOR CONTROLLING A DISPLAY DEVICE

(75) Inventors: Thomas P. Dawson, Escondido, CA (US); Ryuichi Iwamura, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 174 days.

(21) Appl. No.: 10/272,052

(22) Filed: Oct. 15, 2002

(65) Prior Publication Data

US 2004/0070564 A1  Apr. 15, 2004

(51) Int. Cl.
*G09G 5/08* (2006.01)

(52) U.S. Cl. ........................ 345/158; 345/169

(58) Field of Classification Search ................ 345/156, 345/157, 158, 159, 168, 169, 163; 74/471 XY; 348/734; 273/148 B
See application file for complete search history.

(56) References Cited

U.S. PATENT DOCUMENTS

| | | | |
|---|---|---|---|
| 4,796,019 A * | 1/1989 | Auerbach | 345/169 |
| 4,862,152 A | 8/1989 | Milner | 345/158 |
| 5,440,326 A | 8/1995 | Quinn | 345/156 |
| 5,627,565 A * | 5/1997 | Morishita et al. | 345/158 |
| 5,703,623 A * | 12/1997 | Hall et al. | 345/158 |
| 5,825,350 A | 10/1998 | Case, Jr. et al. | 345/163 |
| 5,898,421 A | 4/1999 | Quinn | 345/156 |
| 5,926,168 A * | 7/1999 | Fan | 345/158 |
| 5,949,403 A * | 9/1999 | Umeda et al. | 345/157 |
| 6,014,129 A * | 1/2000 | Umeda et al. | 345/158 |
| 6,501,515 B1 * | 12/2002 | Iwamura | 348/734 |
| 6,535,198 B1 * | 3/2003 | Fan | 345/158 |
| 6,603,420 B1 * | 8/2003 | Lu | 341/176 |
| 2002/0122027 A1 * | 9/2002 | Kim | 345/167 |

* cited by examiner

Primary Examiner—Xiao Wu

(57) ABSTRACT

Embodiments of the present invention are directed to a method and system for controlling a display device. In one embodiment, a start position is registered which defines the first position and orientation of a remote controller relative to the position of the display device. When movement of the remote controller is detected, a second position and orientation of the remote controller is determined. A point on the display device is determined where a mathematical line extending from the front edge of the remote controller along its longitudinal axis intersects the front plane of the display device. Finally, a message is sent for causing a cursor displayed on the display device to be moved to the point where the mathematical line intersects the front plane of the display device.

13 Claims, 10 Drawing Sheets

METHOD AND SYSTEM FOR CONTROLLING A DISPLAY DEVICE

FIELD OF THE INVENTION

Embodiments of the present invention relate to the field of wireless devices. More specifically, the present invention pertains to wireless control of a cursor image for a display device.

BACKGROUND OF THE INVENTION

Due to current technology trends, television is becoming an increasingly interactive medium. Currently, more that 20 million users subscribe to interactive television services in the United States alone. Interactive television combines traditional television viewing with the interactivity of the Internet and the personal computer. End users can enjoy customized programming content, links to Web sites through television links, electronic mail, chat room activity, and online commerce using their television by communicating information and requests back to the service provider using a back channel.

Some of the features of interactive television programming include interacting with television shows (e.g., game shows, news polls, and surveys), interactive entertainment and programming guides, video conferencing, interactive gaming, distance learning, instant messaging and e-mail. A variety of commercial transactions can also be supported such as home banking and home shopping.

Service providers (e.g., cable companies, satellite television operators etc.) are also focusing upon creating fast content delivery networks capable of delivering high bandwidth (e.g., 550 MHz to 1 GHz) television broadcasts to end users. The increased bandwidth facilitates providing users with a wider variety of programming and services. Additionally, as the emerging Digital Television standards gain acceptance, the interactive features offered to end users will be increased because digital televisions systems are capable of using the available bandwidth more efficiently.

However, while television technology is becoming increasingly sophisticated, the means of interacting with it are not. The most common method for a user to interact with a television comprises entering key presses to indicate which channel the end user wants to view. Alternatively, the end user can control a simplified menu interface by using directional buttons to highlight a desired menu selection. Many users find this system inconvenient and time consuming and would prefer a control interface that looks and functions in a manner similar to a web browser interface, with which many of the users are already familiar. However, the directional buttons used with prior art television control devices are not well suited for controlling the movement of a cursor.

For example, web pages are designed with the idea that the user is controlling an on-screen pointer (e.g., arrow pointer or cursor) by moving a mouse. Efforts have been made to adapt this method to television interfaces by adding a mouse or a trackball device as a second input device to the television. This is inconvenient for many users because the user has to switch between different input devices to interact with the television. Placing a trackball on the remote controller itself eliminates the need for a dedicated cursor controller, but is difficult for many users to operate as well.

U.S. Pat. No. 5,440,326; titled "Gyroscopic Pointer," issued Jan. 5, 1993, and U.S. Pat. No. 5,825,350; titled "Electronic Pointing Apparatus and Method," issued Oct. 20, 1998, as well as U.S. Pat. No. 5,898,421; titled "Gyroscopic Pointer and Method," issued Apr. 27, 1999, describe pointing devices which are used to control the movement of a cursor. These devices determine how much the controller has been moved using mechanical gyroscopes and use this information to re-position a cursor a comparable distance upon a computer display.

Mechanical gyroscopes calculate the angle a device has moved due to changes in the rotational velocity of the gyroscope. However, mechanical gyroscopes are subject to a phenomenon called bias drift which results in significant margins of error over time. For example, a stationary gyroscope should output readings showing no change in rotational velocity. In reality, the readings will differ from that ideal value due to bias drift. Each calculation of angle introduces a margin of error, and as the angles are added together, this margin of error becomes greater and greater and can, over time, make it practically impossible to accurately determine angular displacement.

Another controller is taught in U.S. Pat. No. 4,862,152 titled "Sonic Positioning Device," issued Jan. 25, 1990. This device senses the position of a controller in three dimensions by sensing the position of an ultrasonic transmitter relative to an array of ultrasonic receivers. However, this device does not determine a point on a display device at which the controller is pointed, but relies upon being able to sense the position of the controller itself. Because the controller must be repositioned rather than simply reoriented, relatively large hand movements are required to define cursor movements. Additionally, this controller relies upon ranging techniques, the range and resolution of the device is limited.

SUMMARY OF THE INVENTION

Thus, a need exists for a method and system for controlling a display device which provides a user with a more natural method for interacting with the control interface. More specifically, while meeting the above stated need, it would be advantageous to provide a method and system for controlling a cursor on a display device, such as a television.

In one embodiment of the present invention, a start position is registered which defines the first position and orientation of the remote controller relative to the position of the display device. Then, movement of the remote controller is detected and a second position and orientation of the remote controller is determined. A point on the display device is determined where a mathematical line extending from the front edge of the remote controller along its longitudinal axis intersects the front plane of the display device. Finally, a message is sent for causing a cursor displayed on the display device to be moved to the point where the mathematical line intersects the front plane of the display device.

In one embodiment, movement of the remote controller is detected using accelerometers within the remote controller. For example, the accelerometers provide data which is used to derive the location and orientation of the remote controller when it is moved to its second position. In another embodiment, cameras are used to detect the position of the remote controller. For example, a pair of cameras detect light emitting diodes disposed along the front edge of the remote controller. Stereo pair processing is performed which compares the separate images provided by the pair of cameras to derive the location and orientation of the remote controller when it is moved to its second position.

Another embodiment of the present invention uses accelerometers within the remote controller to detect the relative motion of the remote controller. When a user moves the remote controller in a desired direction, the remote controller uses data from the accelerometers to determine the relative direction and distance of the movement. The remote controller then sends a message to the television for causing the cursor to be moved in a direction and distance that is scaled to the movement of the controller.

Thus, embodiments of the present invention provide a user with a more natural method for interacting with a display device. Embodiments of the present invention can be used, for example, for controlling a cursor displayed upon a television. In embodiments of the present invention, a user may control the location of the cursor by aiming a remote controller at the position on the television where they would like the cursor to be displayed. This makes interacting with the display device truly "point and click." In other embodiments of the present invention, when a user moves the remote controller in a desired direction, the cursor is moved in a direction and distance that is scaled to the movement of the controller. The user controls the cursor by moving the remote controller and can select an item by, for example, pressing a button on the remote controller.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1:
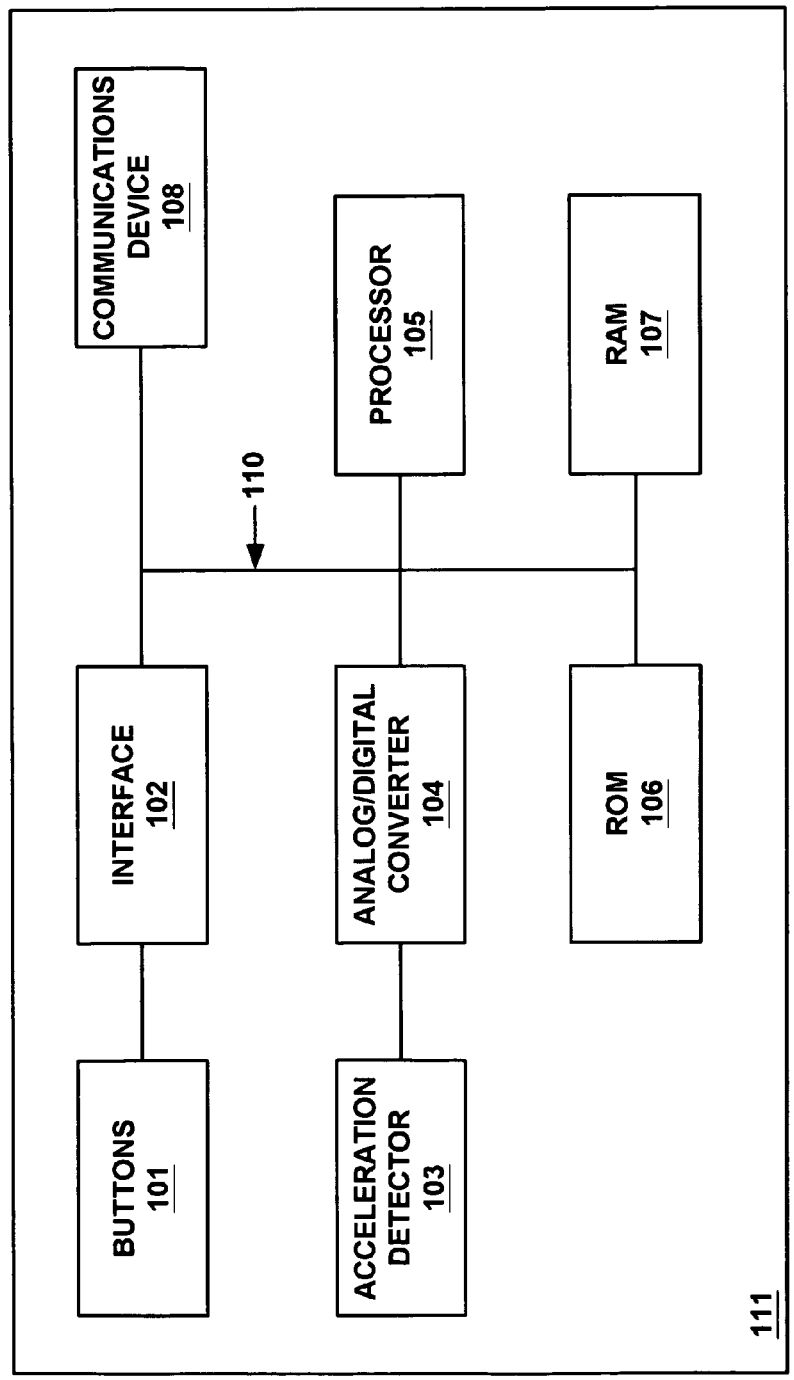
FIG. 1 is a block diagram of a controller for a display device used in embodiments of the present invention.

FIG. 1 is a block diagram of a controller (e.g., a remote control) for a display device used in embodiments of the present invention. In the embodiment of FIG. 1, a plurality of buttons 101 are coupled with a bus 110 using an interface 102. In embodiments of the present invention, buttons 101 comprise a plurality of buttons that a user typically uses to control a display device such as a television. This may include volume buttons, channel selection buttons, and a plurality of numbered buttons, etc. Additionally, controller 100 comprises an acceleration detector 103 coupled with bus 110 via analog/digital converter 104. Acceleration detector 103 is for detecting movement of controller 100 and for providing data to a processor 105 that is used for determining the position and/or orientation of controller 100. In embodiments of the present invention, acceleration detector 103 detects linear changes of velocity of controller 100. Analog/digital converter 104 converts analog signals from acceleration detector 103 into digital signals which are compatible with processor 105.

In embodiments of the present invention acceleration detector 103 is a multi-axis accelerometer which is used in determining the location and orientation of controller 100 as it moved. Similar accelerometer technology is currently used in stabilizing the image in home video camcorders. As a user moves the camcorder, the accelerometer tracks the camera position in three dimensional space and compensates to produce a stable video image. A variety of companies support the camcorder industry with inexpensive multi-axis accelerometers. Using accelerometers that detect changes in linear acceleration are advantageous over prior art devices because they are not prone to the margin of error associated with gyroscopes due to bias drift.

Controller 100 further comprises a read-only memory (ROM) 106 coupled with bus 110 for storing static information and instructions for processor 105 and a volatile memory (e.g., random access memory RAM) 107 coupled with bus 110 for storing information and instructions for processor 105. In embodiments of the present invention, processor 105 uses acceleration data from acceleration detector 103 to derive a plurality of vector components (e.g., the x-axis component, y-axis component, and z-axis component) which describe the location of controller 100 when it is moved from a first, defined position to a second position. Additionally, processor 105 uses acceleration data from acceleration detector 103 to derive the relative roll, pitch, and yaw of controller 100 when it is moved from the first position to the second position. Using this information, the direction in which controller 100 is pointed, herein referred to as its orientation, is derived.

In the embodiment of FIG. 1, controller 100 further comprises a communications device 108 coupled to bus 110 for sending messages generated by processor 105. In embodiments of the present invention, communications device 108 is a wireless communications device such as an infra-red emitter or radio frequency transmitter. These components may be housed on a circuit board 111 that is contained within controller 100.

Figure 2A:
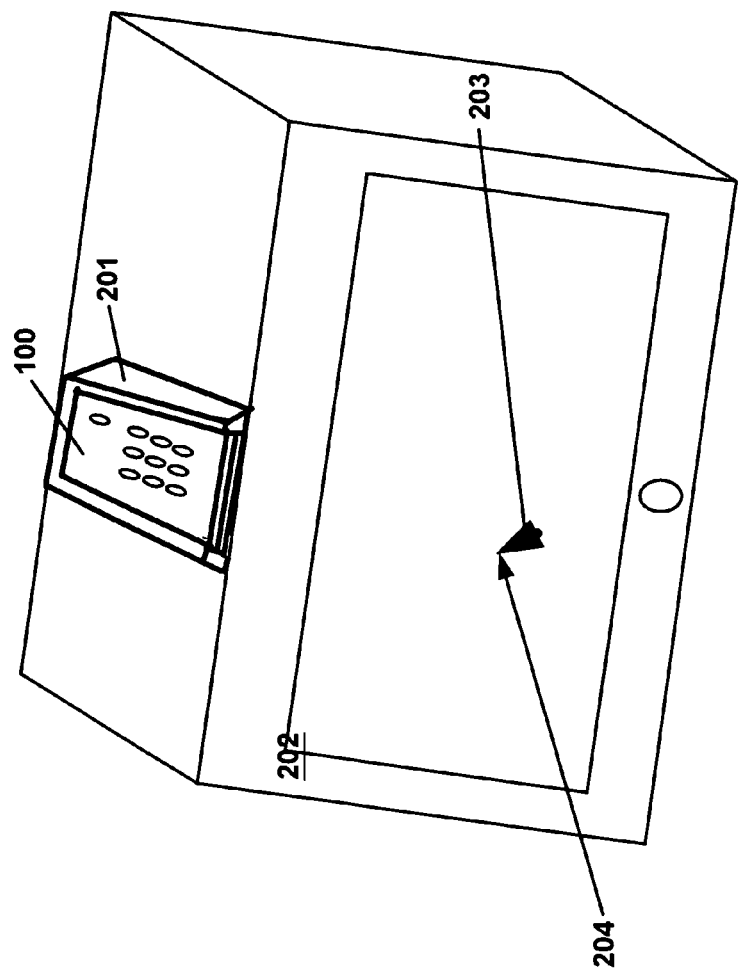
FIGS. 2A and 2B show a system for controlling for a display device in accordance with embodiments of the present invention.
Figure 2B:
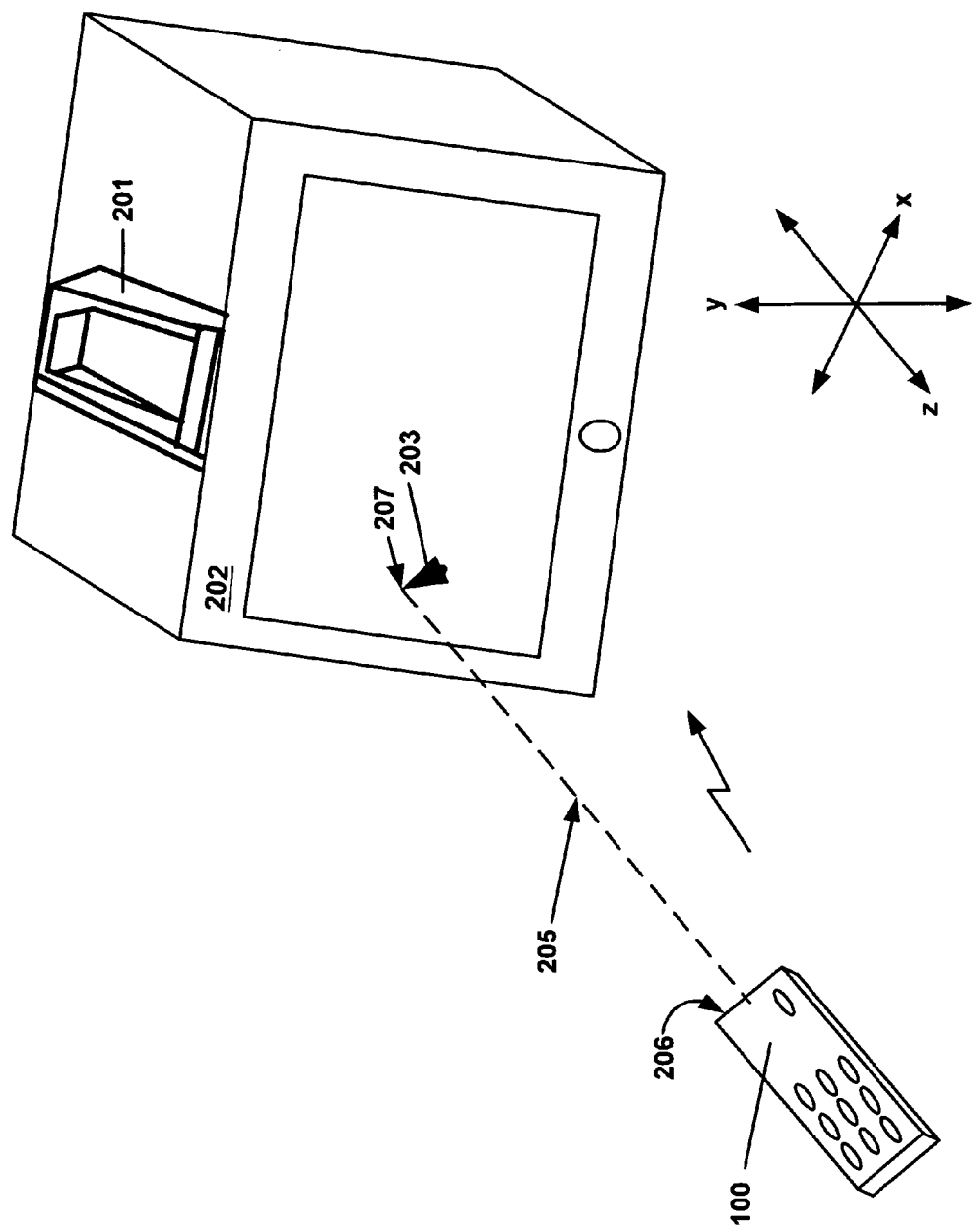

FIGS. 2A and 2B show a system for controlling for a display device in accordance with embodiments of the present invention. In FIG. 2A, a cradle 201 is coupled at a known or registered position upon the surface of the display device. In embodiments of the present invention, cradle 201 may be fixedly attached to display device 202. In embodiments of the present invention, the outer case of display device 202 may be molded so that cradle 201 is an integral part of the outer case.

In embodiments of the present invention, cradle 201 defines a start position for controller 100. In other words, the position and orientation of controller 100 relative to the front plane of display device 202 are defined when controller 100 is placed upon cradle 201. A user can place controller 100 upon cradle 201 when they are not using the controller to interact with display device 202. At such time, the position of the controller becomes registered. That is, the coordinates of the controller relative to the display device are known.

In embodiments of the present invention, when controller 100 is placed upon cradle 201, a cursor 203 is automatically displayed at a first position. In embodiments of the present invention, controller 100 can detect when it resides upon cradle 201 and automatically generates a message to display device 202 for causing cursor 204 to be displayed at its default position. For example, in FIG. 2A, a cursor 203 is automatically displayed at the center 204 of display device 202 when controller 100 is placed upon cradle 202. Thus, when controller 100 is placed in cradle 201, its location and orientation are known and associated with the position of cursor 203 in the center of display device 202.

In FIG. 2B, controller 100 is shown after it has been moved from cradle 201 to a second position. Acceleration detector 103 detects the movement of controller 100 and provides data to processor 105 which is used to derive the location and orientation of controller 100 in three dimensional space relative to display device 202. Controller 100 can then determine a mathematical line 205 that extends from the forward edge 206 of controller 100 along its longitudinal axis. Because it has derived its current location and orientation relative to display device 202, it can determine a point where mathematical line 205 intersects the front plane of display device 202. In other words, controller 100 can determine a two dimensional point 207 on display device 202 at which it is pointed after having been moved from cradle 201. Controller 100 then sends a message using communications device 108 for causing display device 202 to display cursor 203 at that point (e.g., point 207 of FIG. 2). Alternatively, the controller can send data wirelessly from the accelerometers to the display device and the display device can perform the above computation to determine the two dimensional coordinates 207.

Figure 3:
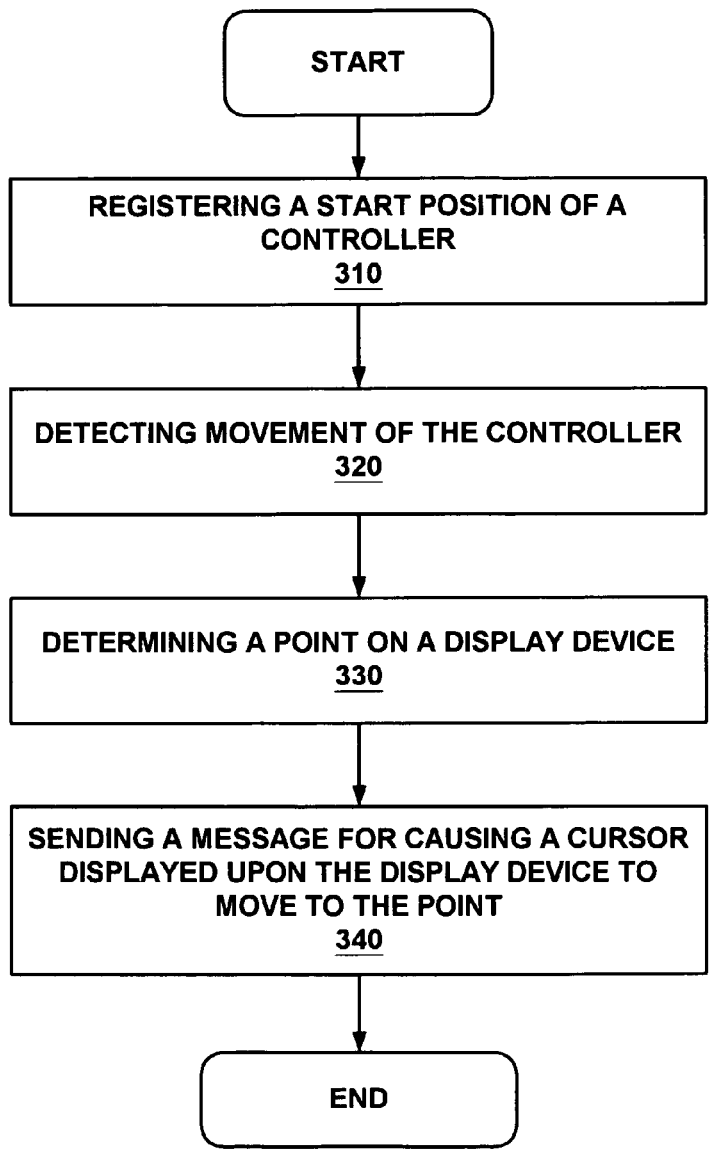
FIG. 3 is a flowchart of a method for controlling a display device in accordance with embodiments of the present invention.

FIG. 3 is a flowchart of a method for controlling a display device in accordance with embodiments of the present invention. In step 310 of FIG. 3, a start position of a controller is registered with respect to the display device. In embodiments of the present invention, the start position defines a first location and orientation of the controller relative to a display device. Referring again to FIG. 2A, when controller 100 is placed upon cradle 201, its location and orientation are defined relative to the frontal plane of display device 202.

In step 320 of FIG. 3, movement of the controller is detected. As controller 100 is picked up from cradle 201 and moved to a second position, the movement is detected using acceleration detector 103 of FIG. 1.

In step 330 of FIG. 3, a point on a display device is displayed. Using the data from acceleration detector 103, processor 105 derives vector components of the movement from the registered start position of step 310 to the second position. In so doing, a second location and orientation of controller 100 relative to the frontal plane of display device 202 is derived. Processor 105 also uses roll, pitch, and yaw data derived from acceleration detector 103 to derive a second orientation of controller 100. By comparing the second location and second orientation of controller 100 with the known location and orientation of the frontal plane of display device 202, a mathematical line (e.g., mathematical line 205 of FIG. 2) can be projected that extends longitudinally from the front edge of controller 100 to display device 202. Controller 100 can also determine a point where mathematical line 205 intersects the frontal plane of display device 202. Alternatively, the display device could compute this point based on the discussion above.

In step 340 of FIG. 3, a message for causing a cursor (e.g., cursor 203 of FIG. 2) displayed upon the display device to move to the point is sent. In embodiments of the present invention, controller 100 sends a wireless message to display device 202 via communications device 108. This message conveys information to display device 202 for causing it to display a cursor from a first position (e.g., cursor position 204 of FIG. 2), to a second position (e.g., point 207 of FIG. 2). Point 207 is the point at which mathematical line 205 intersects with the frontal plane of display device 202. Such a message can periodically be sent to the display device while the controller is pointed at the display to update the cursor location.

Using controller 100, a user can control a cursor on display device 202 by pointing the end of the controller toward the display screen at the desired screen location. When the cursor is displayed at a desired portion of display device 202, the user can, for example, depress a button on controller 100 to make an indication in a manner similar to making a selection using a mouse. Thus, the present invention allows a user to interact with display interfaces in a more natural manner and without the necessity of multiple display controllers.

Figure 4A:
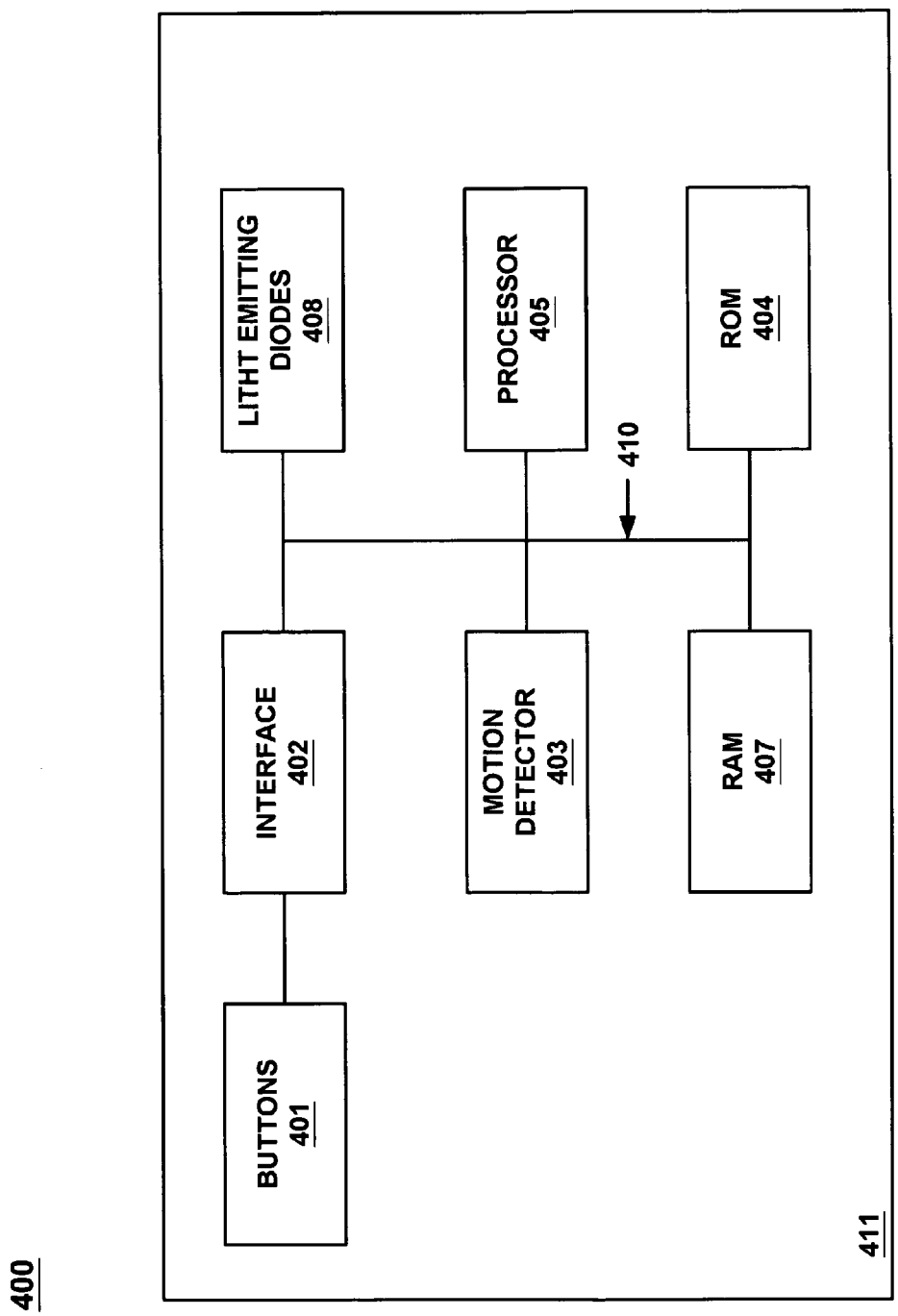
FIGS. 4A and 4B are block diagrams of components for controlling a display device in accordance with embodiments of the present invention.

FIG. 4A is a block diagram of another controller for a display device used in embodiments of the present invention. In the embodiment of FIG. 4A, a plurality of buttons 401 are coupled with a bus 410 using an interface 402. In embodiments of the present invention, buttons 401 comprise a plurality of buttons that a user typically uses to control a display device such as a television. This may include volume buttons, channel selection buttons, and a plurality of numbered buttons, etc. Embodiments of the controller 400 also comprise a motion detector 403 coupled with bus 410.

Controller 400 further comprises a read-only memory (ROM) 406 coupled with bus 110 for storing static information and instructions for processor 405 and a volatile memory (e.g., random access memory RAM) 407 coupled with bus 110 for storing information and instructions for processor 405. These components may be housed on a circuit board 411 that is contained within controller 400. In FIG. 4A, controller 400 further comprises a plurality of light emitting diodes 408 that are disposed along a front edge of a housing enclosing controller 400 and are coupled with bus 410.

Figure 4B:
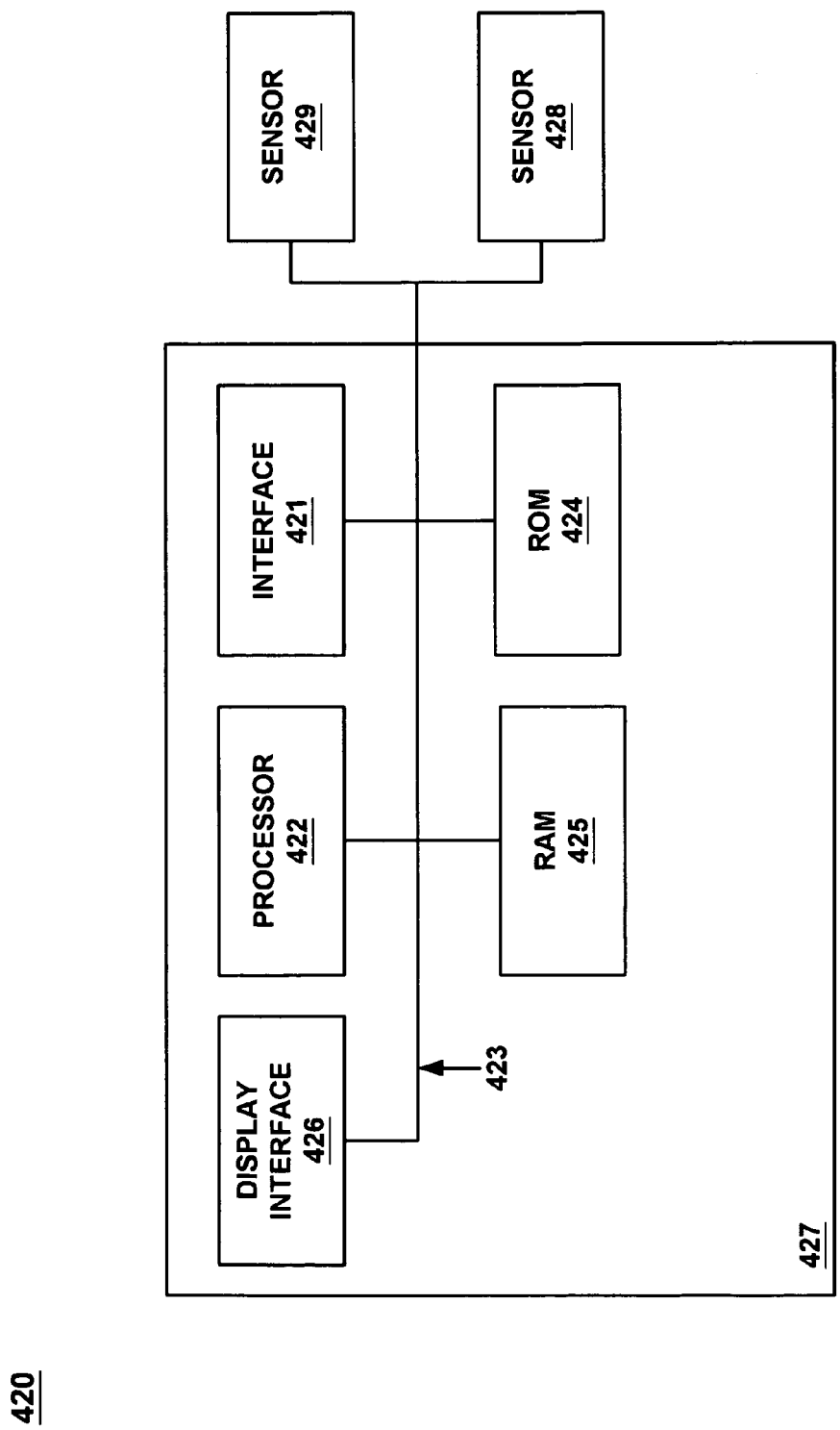

FIG. 4B shows a sensing apparatus 420 that is used in conjunction with controller 400 to control a display device in accordance with embodiments of the present invention. In sensing apparatus 420, a processor 422 is coupled via bus 423 to sensors 428 and 429. In one embodiment, sensors 428 and 429 are digital imaging sensors (e.g., a charge coupled device CCD, etc.). Sensing apparatus further comprises a non-volatile memory (e.g., read-only memory ROM 424) coupled with bus 423 for storing static information and instructions for processor 422 and a volatile memory (e.g., random access memory RAM 425) coupled with bus 423 for storing information and instructions for processor 422. These components may be housed on a circuit board 427. A display interface 426 is coupled with bus 423 and is used for converting data from processor 422 into a suitable format for a display device. For example, display interface may comprise an analog/digital converter for converting digital data from processor 422 into a VGA format for a computer monitor.

Figure 5:
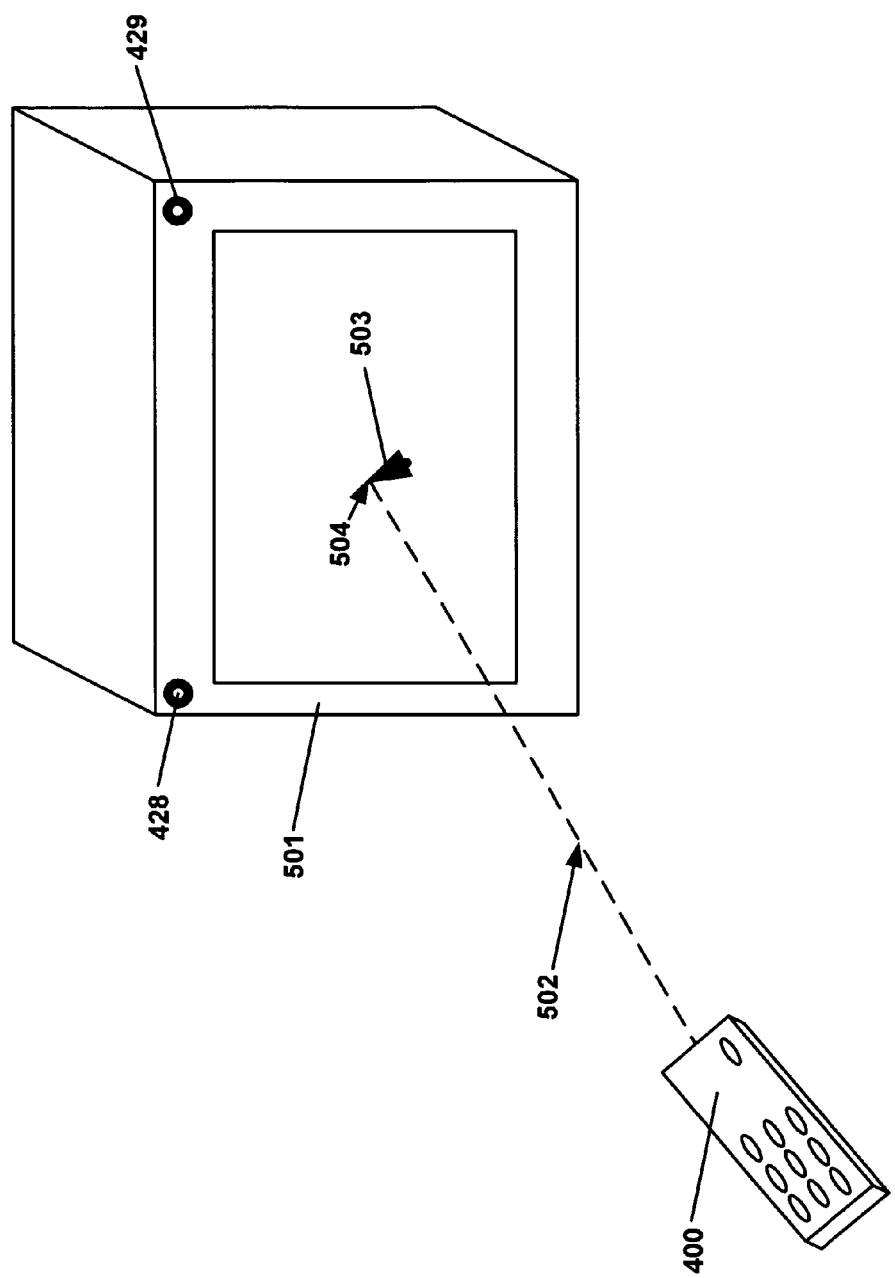
FIG. 5 shows another embodiment of a system for controlling a display device in accordance with embodiments of the present invention.

FIG. 5 shows another system for controlling a display device in accordance with embodiments of the present invention. In the embodiment of FIG. 5, sensors 428 and 429 are operable for detecting the light emitting diodes (e.g., light emitting diodes 408 of FIG. 4A) disposed along the front edge of controller 400. In one embodiment, sensors 428 and 429 are disposed on the front edge of display device 501. However, sensing apparatus 420 may comprise a stand alone system which can be coupled with display device 501 as an add-on component and wherein sensors 428 and 429 are individual components. In embodiments of the present invention, at least 3 light emitting diodes 408 are disposed along the front edge of controller 400 and thus define a plane corresponding to the frontal plane of controller 400.

In one embodiment, when motion detector 403 detects movement of controller 400, it sends an indication to processor 405 which in turn causes light emitting diodes 408 to become biased. Light emitting diodes 408 are then detected by sensors 428 and 429. Each of sensors 428 and 429 detect the light emitting diodes 408 of controller 400 at a different angle and send pairs of imaging data to processor 422 when they detect light from light emitting diodes 408. Processor 422 performs stereo pair processing upon these pairs of imaging data to determine the three dimensional location and orientation of controller 400 relative to the location and orientation of display device 501.

Stereo pair processing reconciles the two images detected by sensors 428 and 429 into a single perceived image. For example, the angle from sensor 428 to controller 400 is compared with angle from sensor 429 to controller 400 to determine the position of controller 400 relative to display device 501 in both the x and y axes. By comparing both of these angles with the distance between sensors 428 and 429, the distance from controller 400 to display device 501 can be determined. The orientation of controller 400 can similarly be derived by comparing the relative positions of light emitting diodes 408. Because the 3 light emitting diodes define a plane corresponding to the frontal plane of controller 400, a mathematical line 502 can be extended from the frontal edge of controller 400 along its longitudinal axis. Processor 422 can then determine a point 503 on display device 501 where mathematical line 502 intersects with the frontal plane of display device 501. Processor 422 then generates instructions to display device 501 via display interface 426 for causing display device 501 to display a cursor (e.g., cursor 504) at the point corresponding to the point where mathematical line 502 intersects with the frontal plane of display device 501.

Figure 6:
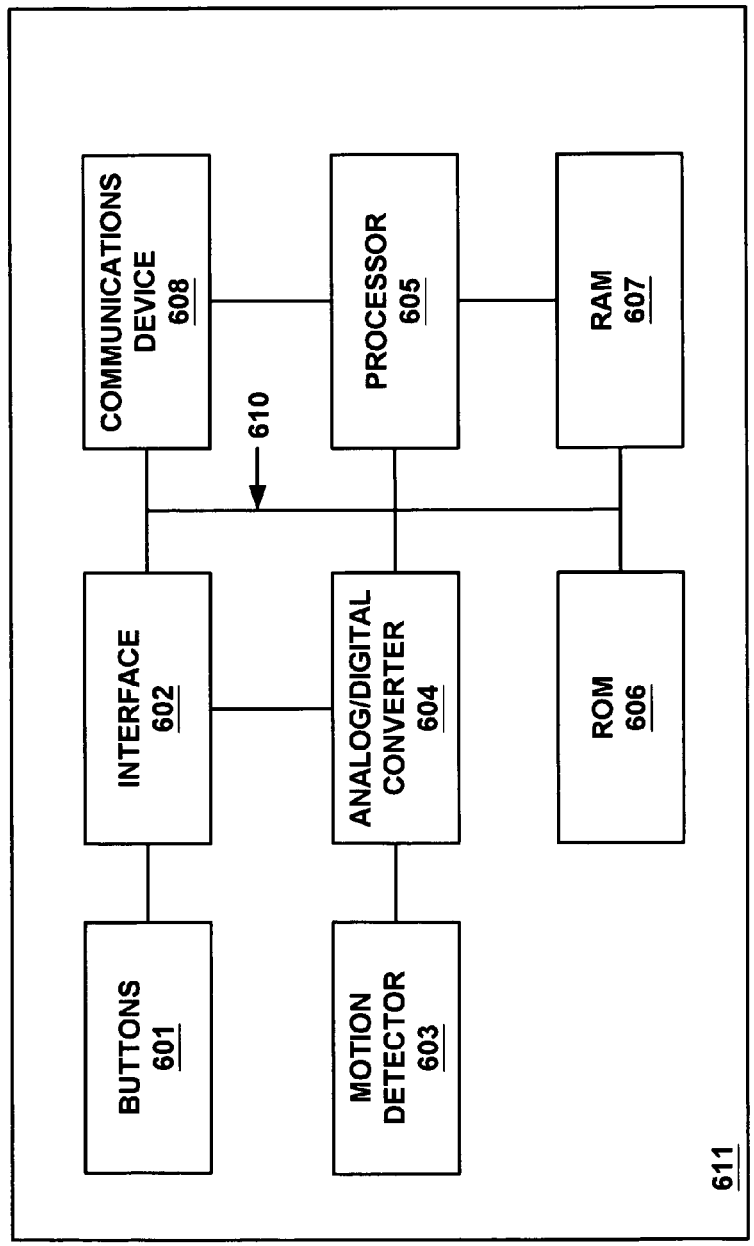
FIG. 6 is a block diagram of another controller used in accordance with embodiments of the present invention.

FIG. 6 is a block diagram of another controller used in embodiments of the present invention. In the embodiment of FIG. 6, a plurality of buttons 601 are coupled with a bus 610 via an interface 602. In embodiments of the present invention, buttons 601 comprise a plurality of buttons that a user typically uses to control a display device such as a television. This may include volume buttons, channel selection buttons, and a plurality of numbered buttons, etc. Additionally, controller 600 comprises a motion detector 603 coupled with bus 610 via analog/digital converter 604. Motion detector 603 is for detecting movement of controller 600 and for providing data to a processor 605 that is used for determining the position of controller 600 when it has been moved. In embodiments of the present invention, motion detector 603 detects linear changes of velocity of controller 600 and outputs a signal describing these changes in linear velocity. Analog/digital converter 604 converts analog signals from motion detector 603 into digital signals which are compatible with processor 605.

In one embodiment, motion detector 603 comprises a plurality of tilt sensors operable for detecting changes in the linear motion of controller 600. In another embodiment of controller 600, motion detector further comprises a geomagnetic detector operable for detecting movement of controller 600 by sensing relative changes in the Earth's magnetic field when controller 600 is moved. While the present embodiment recites these sensors specifically, the present invention is well suited for utilizing a variety of sensors in motion detector 603.

Controller 600 further comprises a non-volatile memory (e.g., read-only memory ROM 606) coupled with bus 610 for storing static information and instructions for processor 605 and a volatile memory (e.g., random access memory RAM 607) coupled with bus 610 for storing information and instructions for processor 605. In embodiments of the present invention, processor 605 uses data from motion detector 603 to derive a plurality of vector components (e.g., an x-axis component, a y-axis component, and a z-axis component) which describe the relative movement of controller when it is moved from a first position to a second position. Processor 605 can compare these vector components with the first position of controller 600 (which may be stored in RAM 607) to determine its second position after it has been moved.

Processor 605 uses this information to control a cursor displayed upon a display device. For example, referring now to FIG. 8, when a user moves controller 600 from a first position 801 to a second position 802, motion detector 603 detects the vector components of the movement (e.g., x-axis component 810, and y-axis component 811) that describe a direction 812 and a distance 813 from the first position of controller 600 to its second position. Using this information, processor 605 determines a second position for a cursor displayed upon display device 820.

When controller 600 is at first position 801, the cursor is displayed at first cursor position 831. Processor 605 determines second cursor position 832 using the vector components describing the motion of controller 600. Thus, the x-axis component 840 of the cursor is scaled to the x-axis component 810 of controller 600. Similarly, the y-axis component 841 of the cursor is scaled to the y-axis component 811 of controller 600. In so doing, the cursor is moved from first cursor position 831 to second cursor position 832 in a similar direction as the movement of controller 600 from first position 801 to second position 802. Additionally, distance 843 that the cursor is moved is scaled to the distance 813 that controller 600 is moved.

The speed, direction, and magnitude of the movement of the cursor are scaled to the movement of controller 600. For example, a movement of controller 600 of 3 inches in a given direction may result in a movement of the cursor of 1 inch in the same direction. The speed of movement of controller 600 can be derived from acceleration data from motion detector 603.

In the embodiment of FIG. 6, controller 600 further comprises a communications device 608 coupled to bus 610 for sending messages generated by processor 605. In embodiments of the present invention, communications device 608 is a wireless communications device such as an infra-red emitter or radio frequency transmitter. Communications device 608 is for transmitting the message generated by processor 605 for causing the movement of the cursor displayed upon a display device. These components may be housed on a circuit board 611 that is contained within controller 100.

Figure 7:
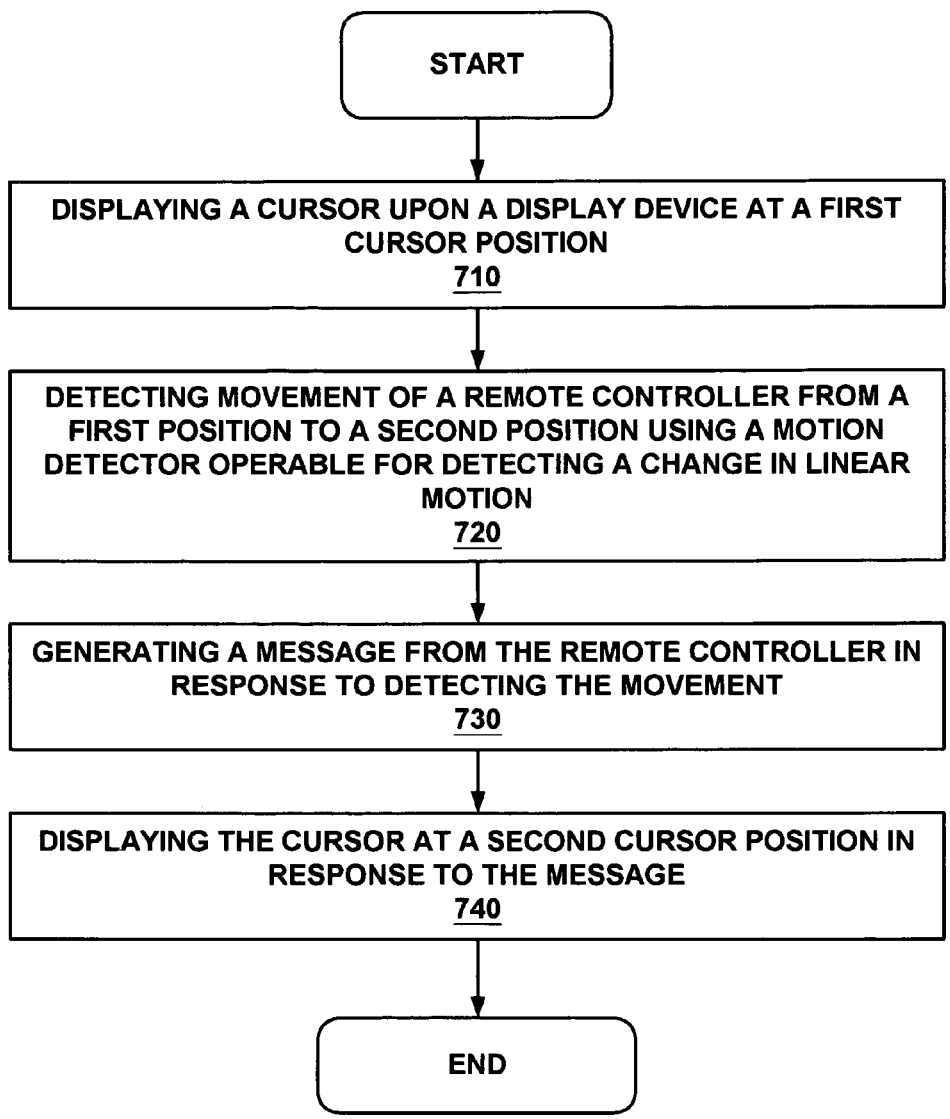
FIG. 7 is a flowchart of a method for controlling a display device in accordance with another embodiment of the present invention.
Figure 8:
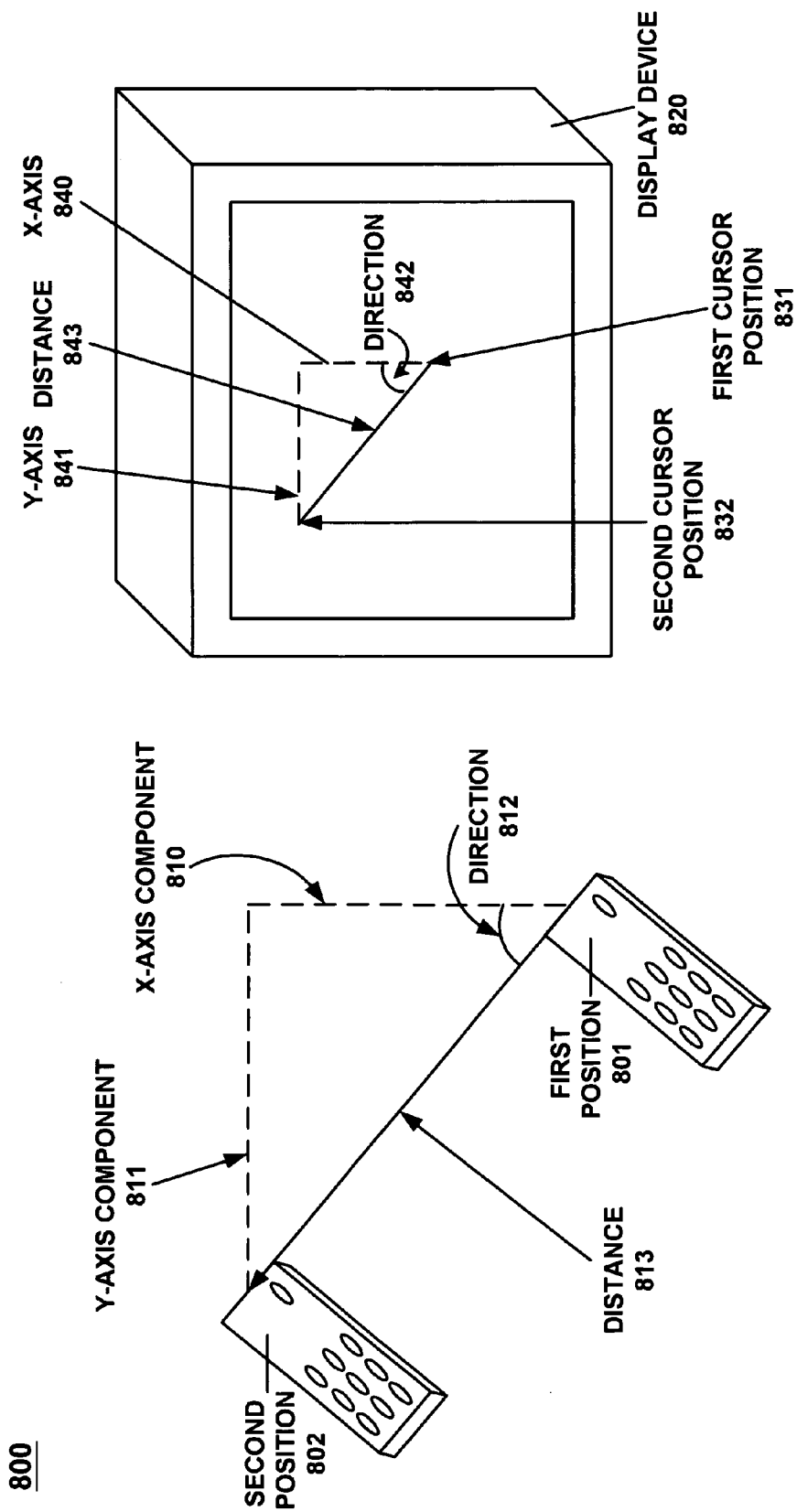
FIG. 8 shows another embodiment of a system for controlling a display device in accordance with embodiments of the present invention.

FIG. 7 is a flowchart of a method for controlling a display device in accordance with another embodiment of the present invention. In step 710 of FIG. 7, a cursor is displayed upon a display device at a first cursor position. Referring to FIG. 8, a cursor is displayed at first cursor position 831 upon display device 820.

In step 720 of FIG. 7, movement of a controller is detected using a motion detector operable for detecting a change in linear motion. Referring to FIG. 6, motion detector 603 is operable for detecting changes in the linear motion of controller 600. Using accelerometers that detect changes in linear acceleration are advantageous over prior art devices that rely upon gyroscopes because they are not prone to the margin of error associated with mechanical gyroscopes due to bias drift.

In step 730 of FIG. 7, a message is generated from the controller in response to detecting the movement. Referring again to FIG. 8, when movement of controller 600 is detected by motion detector 603, processor 605 generates a message for causing a cursor displayed upon a display device 820 to be moved from first cursor position 831 to a second cursor position 832. The direction movement of the cursor (e.g., direction 842 of FIG. 8) is in the same direction as the movement of controller 600 (e.g., direction 812 of FIG. 8). Furthermore, the distance (e.g., distance 843 of FIG. 8) from first cursor position 831 to second cursor position 832 is scaled to the distance (e.g., distance 813 of FIG. 8) between first position 801 of controller 600 and second position 802.

In step 740 of FIG. 7, the cursor is displayed at a second cursor position in response to the message. Referring again to FIG. 8, the cursor is displayed at second cursor position 832 in response to a message from controller 600.

While the above embodiments have been described in the context of controlling a cursor, embodiments of the present invention are well suited for controlling other objects displayed upon a display device. For example, embodiments of the present invention may be adapted to be used as a game controller, etc.

The preferred embodiment of the present invention, a method and system for controlling the position of a cursor upon a display device using a remote controller, is thus described. While the present invention has been described in particular embodiments, it should be appreciated that the present invention should not be construed as limited by such embodiments, but rather construed according to the following claims.

What is claimed is:

1. A method for controlling a display device comprising:
   registering a start position, wherein a remote controller is placed in a cradle coupled with said display device, and wherein a first location and a first orientation of said remote controller are defined relative to said display device;
   detecting movement of said remote controller and responsive thereto determining a second location and a second orientation of said remote controller;
   determining a point on a front plane of said display device wherein a line extending from a front edge of said remoter controller along a longitudinal axis of said remoter controller intersects said front plane; and
   sending a message for causing a cursor displayed upon said display device to be moved to said point.

2. The method as recited in claim 1, wherein said registering further comprises displaying said cursor at an initial point upon said front plane of said display device that is associated with said start position of said remote controller.

3. The method as recited in claim 1, wherein said detecting of said movement comprises using an acceleration detector disposed within said remote controller to detect said movement of said remote controller.

4. The method as recited in claim 3, wherein said determining said second location and said second orientation comprises:
   using said acceleration detector to derive a plurality of vector components of said movement of said remote controller;
   comparing said vector components with said start position; and
   determining said second location and said second orientation of said remote controller based upon said comparing.

5. The method as recited in claim 1, wherein said sending comprises transmitting a wireless message from said remote controller to said display device.

6. The method as recited in claim 5, wherein said message conveys said point on said front plane of said display device to said display device.

7. A remote controller for a display device comprising:
   a motion detecting mechanism coupled to a bus;
   a memory coupled to said bus;
   a wireless communications device coupled to said bus; and
   a processor coupled to said bus and for performing:
   a) determining a current location and a current orientation of said remote controller in response to a movement of said remote controller relative to a known start position of said remote controller, wherein said known start position is defined by a cradle coupled with said display device;
   b) deriving a point on a display device, wherein a mathematical line extending from a front edge of said remote controller along a longitudinal axis of said remote controller intersects a front plane of said display device; and
   c) initiating a message via said wireless communications device for causing said display device to display a cursor at said point on said display device.

8. The controller of claim 7, wherein said cradle defines a first location and a first orientation of said remote controller relative to said display device when said remote controller resides in said cradle.

9. The controller of claim 8, wherein said display device displays said cursor at a pre-determined initial point when said remote controller resides in said cradle.

10. The controller of claim 7, wherein said motion detecting mechanism comprises an acceleration detecting mechanism.

11. The controller of claim 7, wherein said processor derives a plurality of vector components using said acceleration detecting mechanism when said movement is detected.

12. The controller of claim 11, wherein said processor compares said first location and said first orientation of said remote controller with said plurality of vector components to determine said current location and said current orientation.

13. The controller of claim 7, wherein said message conveys said point on said display device to said display device.

* * * * *